United States Patent
Kwoka

[11] Patent Number: 5,924,948
[45] Date of Patent: Jul. 20, 1999

[54] DIFFERENTIAL DRIVE

[75] Inventor: Georg Kwoka, Much, Germany

[73] Assignee: GKN Viscodrive GmbH, Lohmar, Germany

[21] Appl. No.: 09/038,206

[22] Filed: Mar. 10, 1998

[30] Foreign Application Priority Data

Mar. 10, 1997 [DE] Germany .................. 197 09 523

[51] Int. Cl.⁶ ...................................... F16H 48/22
[52] U.S. Cl. ........................................... 475/88
[58] Field of Search ................................. 475/88

[56] References Cited

U.S. PATENT DOCUMENTS

| 4,644,823 | 2/1987 | Mueller | 475/86 |
| 5,087,228 | 2/1992 | Johansson | 475/88 |

FOREIGN PATENT DOCUMENTS

| 8270753 | 10/1996 | Japan . | |
| 8810378 | 12/1988 | WIPO . | |
| 9319310 | 9/1993 | WIPO . | |

*Primary Examiner*—Dirk Wright
*Attorney, Agent, or Firm*—Howard & Howard

[57] ABSTRACT

A differential drive having a controllable locking device is loaded by a differential-speed-dependent actuating device. A rotatingly drivable differential carrier is supported in a drive housing and is provided with axle shaft bevel gears which are co-axially arranged therein and which are connectable by insertable axle shaft journals. A plurality of differential bevel gears are rotatably arranged on radial journals in the housing and each engage both axle shaft gears, with the axes of the journals of the differential bevel gears being positioned in a central plane of the differential carrier. A multi-plate coupling unit for locking purposes is arranged co-axially in the differential carrier relative to the central plane on a first side of the unit and with a pump unit for actuating purposes being arranged co-axially in the differential carrier relative to the central plane on a second side of the unit.

20 Claims, 4 Drawing Sheets

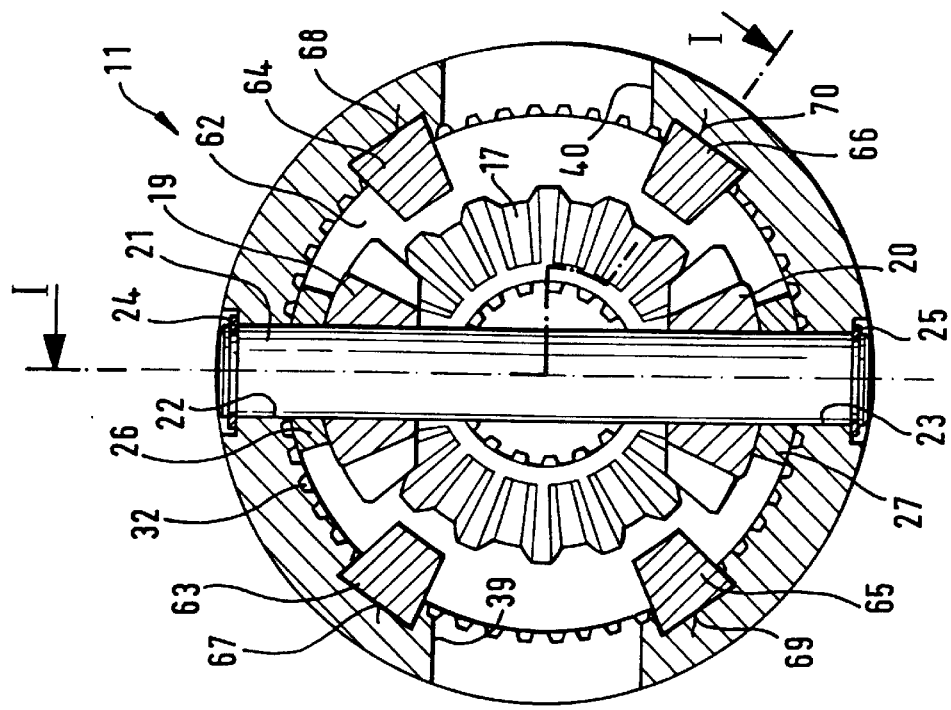
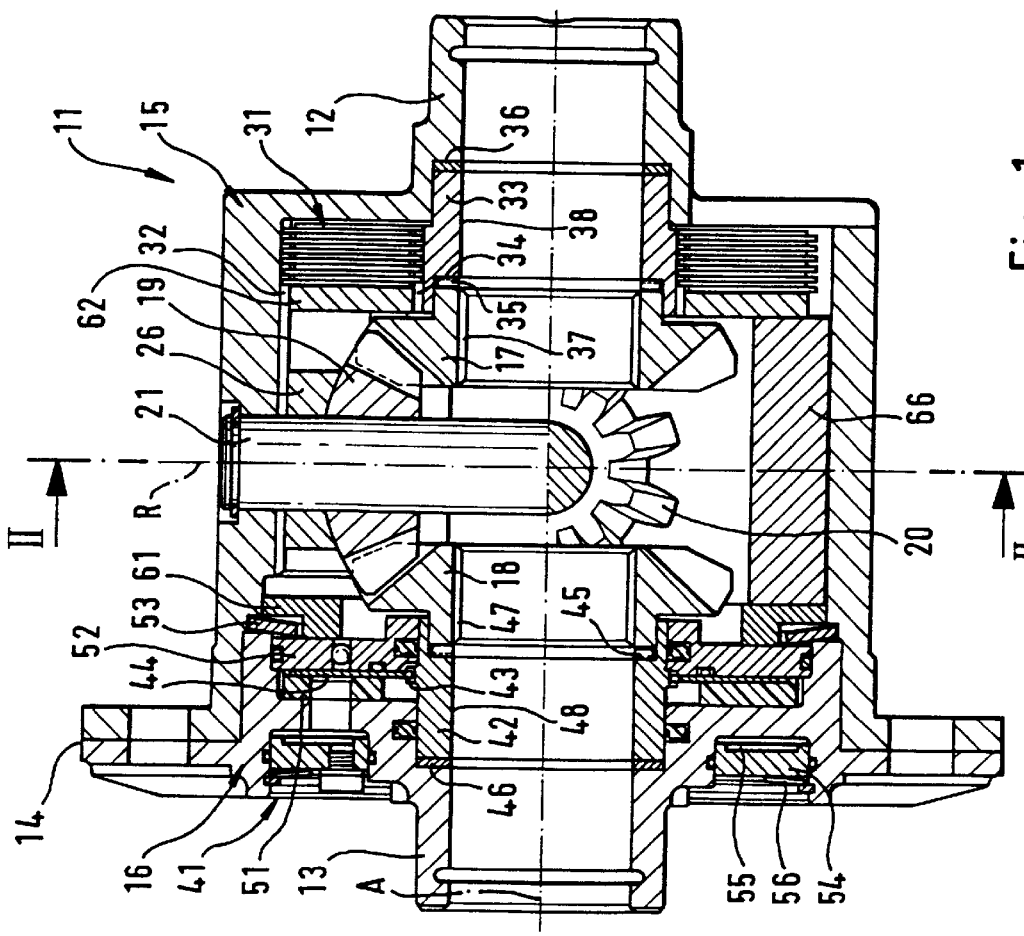

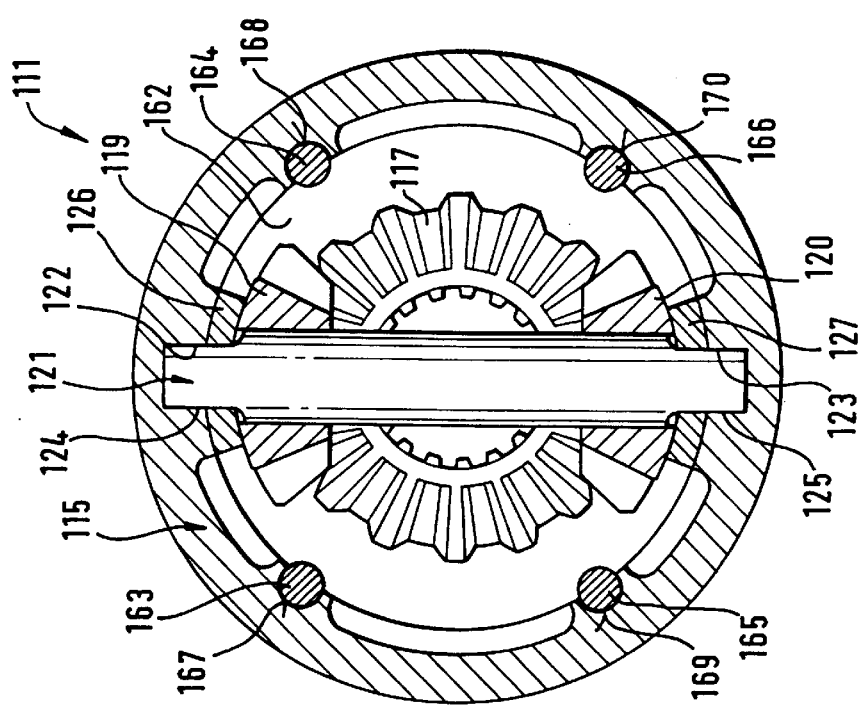
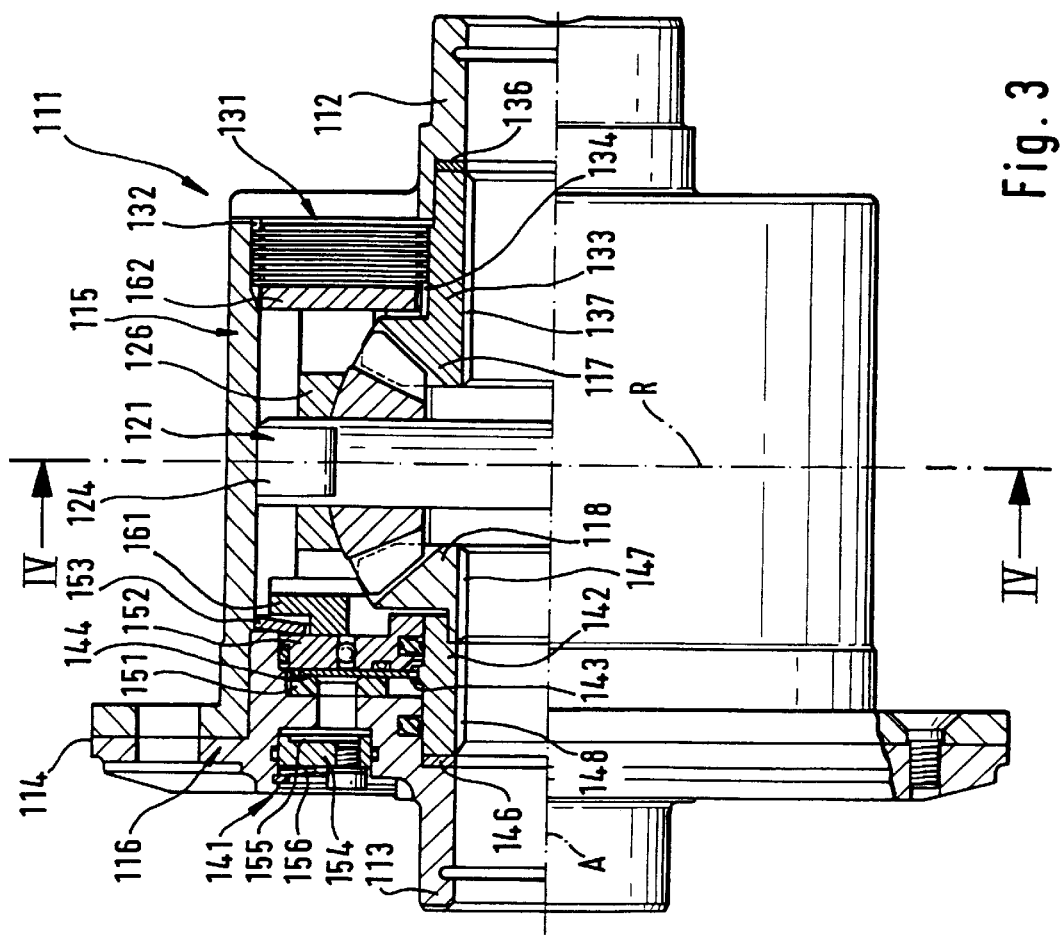
Fig. 4
Fig. 3

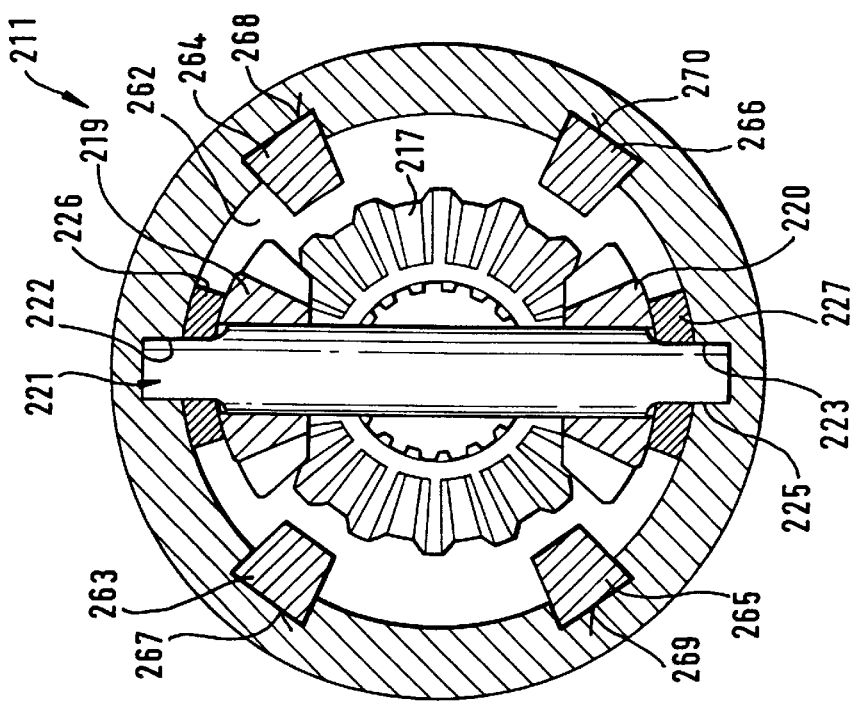
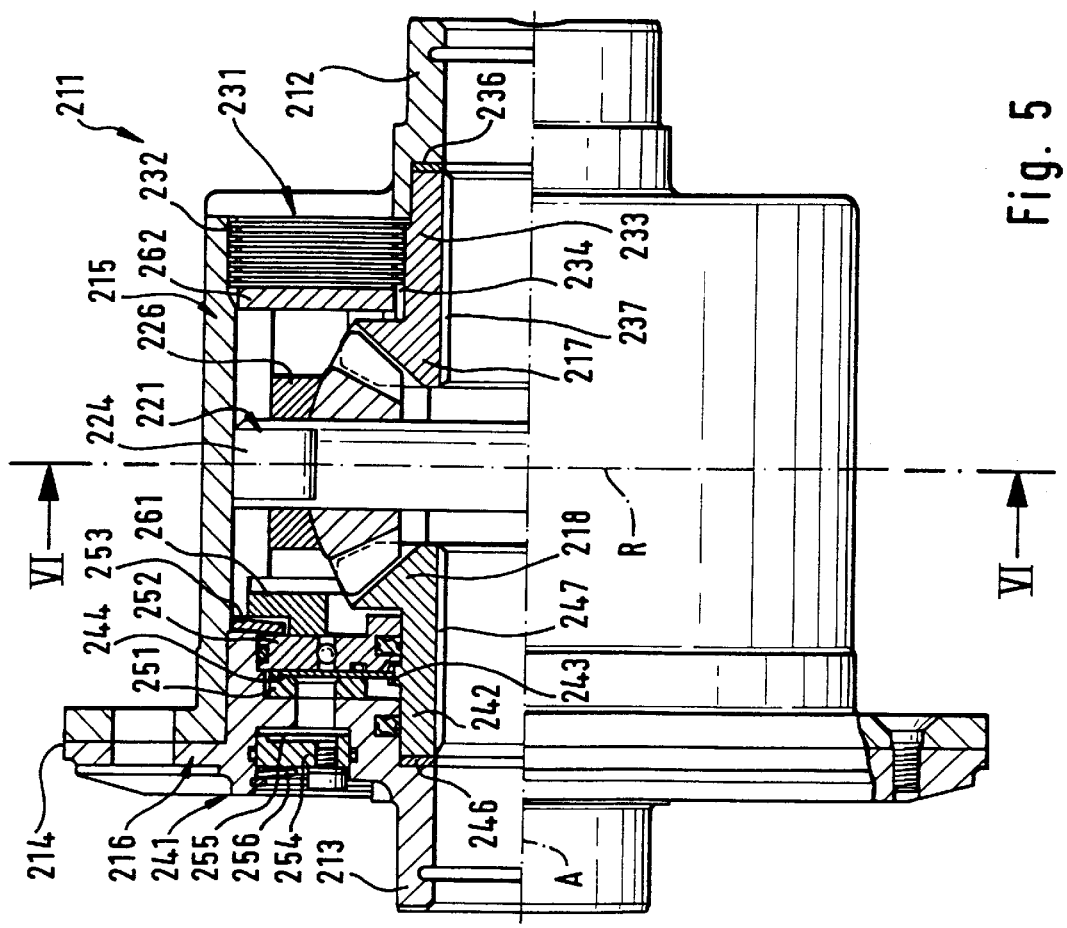
Fig. 6
Fig. 5

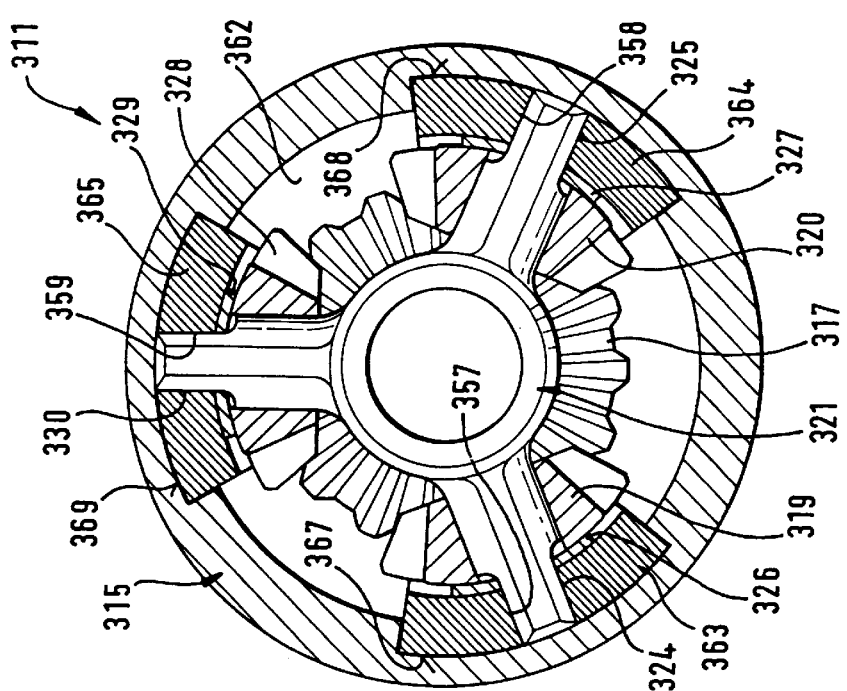
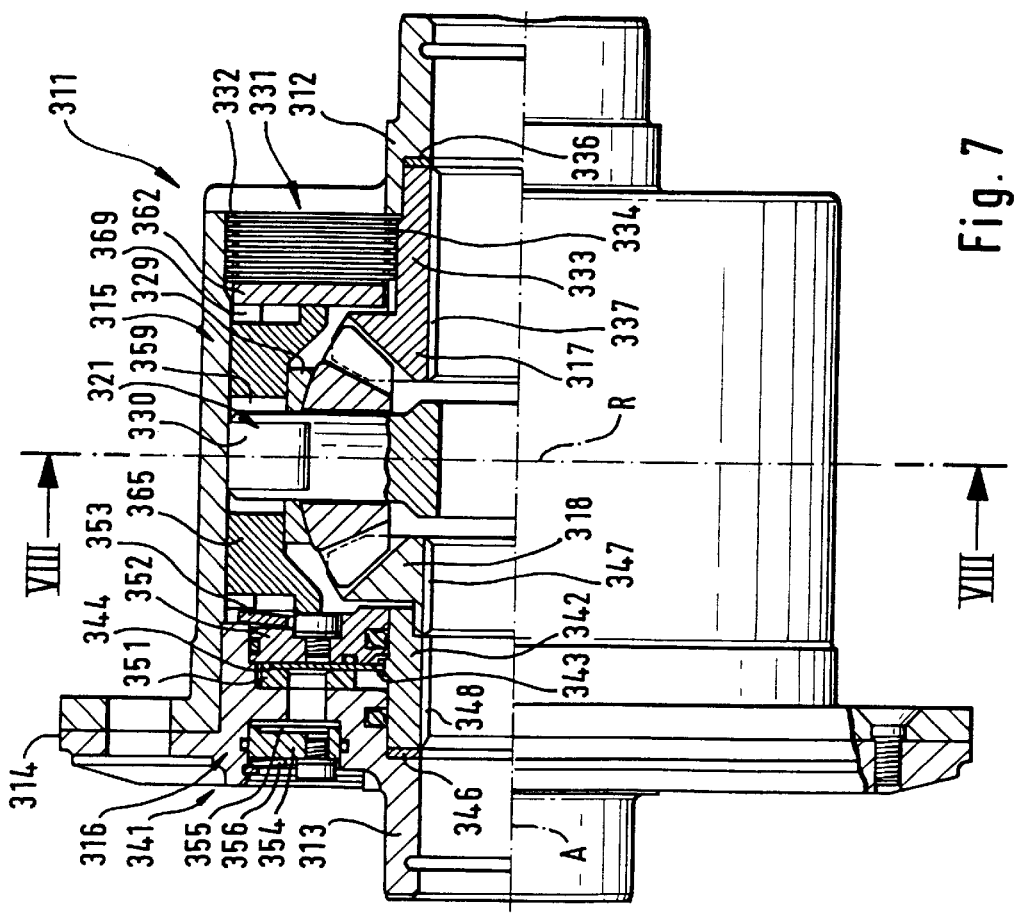

DIFFERENTIAL DRIVE

BACKGROUND OF THE INVENTION

The invention relates to a differential drive having a controllable braking device which is controlled by a differential-speed-dependent actuating device.

A differential drive with a locking device in the form of a multi-plate coupling which is controlled by a hydraulic actuating device is known from DE 38 13 304 A1. The hydraulic device is positioned outside the differential carrier, with an axially movable annular piston acting, by means of an axial pressure bearing, on a pressure ring rotating together with the differential carrier. From said pressure ring the piston force is transmitted to the multi-plate coupling by means of push rods or pressure elements. The hydraulic device is supplied by a pump positioned outside the drive housing. The axle shaft portions positioned inside the drive housing are of different length and design.

U.S. Pat. No. 4,644,823 describes a differential drive of a similar type. In this case, too, a hydraulic actuating device with an annular piston non-rotatably arranged in the drive housing is located outside the differential carrier. The annular piston loads an axially movable pressure bearing which, by means of a plate spring, acts on a pressure ring rotating in the differential carrier. The pressure ring, by means of push rods, transmits the piston force of the hydraulic device to a friction plate unit. In this case, too, the hydraulic pressure is generated by a pump outside the drive housing. The axle shaft journal parts positioned inside the differential housing and differential carrier respectively again are of different length.

It is the object of the present invention to provide a differential drive with a controllable locking device and a differential-speed-dependent actuating device which is of simple design and permits the use of identical axle shaft journals inside the differential housing.

SUMMARY OF THE INVENTION

The objective is achieved by providing a differential drive unit of the above type, comprising a rotatingly drivable differential carrier which is supported in a drive housing and which is provided with axle shaft bevel gears which are co-axially arranged therein and which are connectable to insertable axle shaft journals, and having a plurality of differential bevel gears which are rotatably arranged on radial journals in the housing and which each engage both axle shaft gears, with the axes R of the journals of the differential bevel gears being positioned in a central plane of the differential carrier, and with a multi-plate coupling unit for braking purposes being arranged co-axially in the differential carrier relative to the central plane on a first side of the plane and with a pump unit for actuating purposes being arranged co-axially in the differential carrier relative to the central plane on a second side of the plane.

The pump unit is located inside the differential carrier and, with reference to the multi-plate coupling unit, is positioned symmetrically relative to the central plane defined by the axes R. Both inside the differential carrier and inside the drive housing, this measure leads to axle shaft journal portions of equal length and identical design. There is no need for push rods to pass through the differential carrier nor is there any need for oil pressure pipelines to be guided through the drive housing.

Differential drives of this type are suitable for being used as open differential drives provided in motor vehicles, without the need to carry out considerable changes in the installation environment. The axle shafts of a given design do not have to be modified at all or only in respect of the length of their teeth, and the differential bevel gears can be taken over unmodified, with the axle shaft gears having to be modified at most in respect of their hub design.

A preferred type of pump for the pump unit proposed, in particular, is a Visco-Lok pump wherein the pump unit is provided with a circumferential groove whose length is limited and which rotates together with the housing, and with a shear plate which covers the groove and which rotates together with the driving rotor, wherein under all conditions one end of the groove is connected to the reservoir for the shear fluid and the other end of the groove is connected to a pressure chamber delimited by the piston. Differential drives with such differential speed-dependent pump units are described in DE 43 43 307 A1 for example. The shear fluid, in this case, is a highly viscous fluid, especially silicone oil.

According to a first design feature as regards the pump unit, the driving rotor and the adjoining axle shaft gear can be produced in one piece, which advantageously reduces the number of parts.

According to a further embodiment, the driving rotor and the adjoining axle shaft gear can be produced separately from one another, and they can be provided with identical inner teeth for the purpose of being coupled by an axle shaft journal insertable into both sets of teeth. The advantage of this measure is that the pump unit and the drive part and the multi-plate coupling unit of the differential drive can be mounted independently of one another.

According to a further embodiment of the invention, it is proposed that the driving rotor and the adjoining axle shaft gear are provided with teeth engaging one another at their respective ends facing each other and that the driving rotor is provided with a through-bore for passing through an axle shaft journal insertable into the adjoining axle shaft gear which is provided with inner teeth. The advantages are substantially the same as those mentioned above and referring to the pump unit, the drive part and the multi-plate coupling unit of the differential drive being suitable for being mounted independently of one another. In addition, it is possible to use axle shaft journals with short teeth whose shape is identical to those of prior art open differentials, thus further reducing the need for modifying the installation environment.

For fully pre-assembling the pump unit it is also particularly advantageous if a cover of the differential carrier forms the housing of the pump unit into which housing there is inserted a piston loaded by the pressure generated in the pump unit.

According to an advantageous design feature as regards the multi-plate coupling unit it is proposed that the multi-plate coupling unit is provided with an outer plate carrier which is connected to the differential carrier, and with an inner plate carrier which is arranged coaxially relative to the second one of the axle shaft gears, which adjoins the gear and is connected to the gear. With this measure, in particular, the outer plate carrier can be formed directly by the differential carrier.

For reducing the number of parts, the inner plate carrier and the adjoining axle shaft gear can be produced in one piece.

According to a further embodiment, the inner plate carrier and the adjoining axle shaft gear can be produced separately from one another and are provided with identical inner teeth for the purpose of being coupled by an axle shaft journal insertable into both. This type of rotary coupling is particularly easy to produce.

Finally, it is proposed that the inner plate carrier and the adjoining axle shaft gear are provided with teeth engaging one another at their respective ends facing each other and that the inner plate carrier is provided with a through-bore for passing through an axle shaft journal insertable into the adjoining axle shaft gear provided with inner teeth. In this way it is possible to achieve a short teeth length for the axle shaft journals, which is compatible with the teeth of prior art open differential drives.

For production purposes it is particularly advantageous if sliding members are movably inserted into inwardly opening axial grooves in the differential carrier effect a transmission of force from the piston of the pump unit to a pressure plate of the multi-plate coupling unit. Such open grooves can be broached, and the part referred to as casing unit can also be composed of an entirely cylindrical portion and a further cover.

The grooves are preferably radially outwardly undercut for the purpose of holding the sliding members in such a way that they cannot be lost.

The same design advantages and production-technical advantages are achieved if, according to a further differential bevel gears is inserted into inwardly opening axial grooves in the differential carrier. Such grooves can be finish-produced in one operation, jointly with the above-mentioned grooves.

However, it is also possible to insert the journal part transversely into radial bores in the differential carrier and to secure them by means of securing rings.

The axle shaft journal can be axially secured in the axle shaft gears in such a way that the axle shaft journals, at their ends, are provided with annular grooves and that during assembly, they are passed through the axle shaft gears inwardly beyond their final length and are provided with securing rings inserted into the annular grooves through side housing openings in the differential carrier. Subsequently, the axle shaft journals can be pulled outwardly, as a result of which the securing rings are brought into contact with the axle shaft gears. By subsequently inserting a locking member through the housing openings, it is possible to secure the position of the axle shaft journals inwardly as well in that the axle shaft journals are able to support themselves by means of their inner end faces or end faces on the locking member.

As an alternative to the above, it is also possible for the axle shaft journals to be secured by snap rings relative to the axle shaft gears, which snap rings engage annular grooves in the teeth regions of both parts.

By arranging the pump unit inside the differential carrier the design of the differential drive is simplified considerably. By arranging the pump unit and the multi-plate coupling unit substantially symmetrically it becomes possible, to arrange the differential carrier inside the differential drive housing substantially symmetrically and thus also, with reference to the central plane, to arrange symmetrically the axle shaft bevel gears inside the differential drive housing. This makes it possible to use axle shaft journals which, inside the drive housing, have identical lengths and identical shapes. In particular, it is possible to use identically produced axle shaft journals on both sides.

If the differential drive housing is arranged symmetrically inside the axle housing of a rigid rear axle, it is possible, in particular, to use undivided rigid axle shafts of equal length and identical shape which can be inserted directly into the axle shaft gears.

Further advantages and details of the invention are referred to in the description of the drawings below.

BRIEF DESCRIPTION OF THE DRAWINGS

Preferred embodiments of the invention will be explained below with reference to the drawings wherein FIG. 1 is a longitudinal section through the differential carrier of an inventive differential drive in a first embodiment.

FIG. 2 is a cross-section through the differential carrier according to FIG. 1.

FIG. 3 is a longitudinal section through the differential carrier of an inventive differential drive in a second embodiment.

FIG. 4 is a cross-section through the carrier according to FIG. 3.

FIG. 5 is a longitudinal section through the differential carrier of an inventive differential drive in a third embodiment.

FIG. 6 is a cross-section through the differential carrier according to FIG. 5.

FIG. 7 is a longitudinal section through the differential carrier of an inventive differential drive in a fourth embodiment.

FIG. 8 is a cross-section through the differential carrier according to FIG. 7.

DETAILED DESCRIPTION

Below, FIGS. 1 and 2 will be described jointly. The differential carrier 11 is provided with two projections 12, 13 by means of which it can be supported so as to be rotatable around its axis A in a drive housing (not illustrated). Furthermore, the differential carrier 11 is provided with a flange 14 to which it is possible to bolt a crown wheel by means of which the differential carrier can be driven so as to rotate around its axis A.

The differential carrier 11 consists of a casing 15 with a formed-on projection 12, and of a cover 16 with the formed-on projection 13. Two axle shaft bevel gears 17, 18 are arranged co-axially relative to the axis A and engage two differential bevel gears 19, 20 whose axis R extends radially relative to the longitudinal axis A. The differential bevel gears are positioned on a common journal part 21 which is inserted into radially opposed bores 22, 23 in the casing 15 and secured therein by means of securing rings 24, 25. On their outsides, the differential bevel gears 19, 20 comprise partially spherical faces by means of which they are supported on supporting dishes 26, 27 inserted into the carrier. A multi-plate coupling unit 31 is arranged in the casing 15 so as to extend co-axially relative to the axle shaft bevel gear 17. In this embodiment, the casing 15 forms an outer plate carrier provided with inner teeth 32. An inner plate carrier 33 with outer teeth 34 is arranged so as to adjoin the axle shaft bevel gear 17 and is connected in a rotationally fast way to the axle shaft bevel gear 17 by means of inter-engaging end teeth 35. The inner plate carrier 33 is supported on the casing 15 by means of a stop disc 36. The axle shaft bevel gear 17 is provided with a set of inner teeth 37 into which an axle shaft can be inserted. The plate carrier 33 has a smooth through-bore 38 through which it is possible to guide the corresponding axle shaft with its outer teeth to enable same to be inserted into the inner teeth 37 of the axle shaft bevel gear 17.

The differential carrier 11 is provided with housing openings 39, 40 through which it is possible to insert the securing rings for the axle shaft journals and a locking member.

A pump unit 41 is arranged so as to adjoin the axle shaft gear 38, the pump unit being provided in the form of a prior art Visco-Lok pump. In this embodiment, the cover 16 constitutes the housing of the pump unit. A driving rotor 42 which, by means of outer teeth 43, drives an axially movable shear plate 44, is arranged co-axially relative to, and next to, the axle shaft gear 18. The axle shaft gear 18 and the driving rotor 42 are connected to one another in a rotationally fast way by means of end teeth 45. The driving rotor is axially supported on the cover 16 by means of a stop disc 46. The axle shaft gear 18 comprises inner teeth 47 into which it is possible to insert in a rotationally fast way an axle shaft with corresponding outer teeth. The driving rotor is provided with a smooth through-bore 48 through which the axle shaft, by means of its teeth, can be inserted into the inner teeth 47 of the axle shaft gear 18.

FIGS. 1 and 2 show further details of the pump unit, i.e. a grooved and control member 51 which rotates together with the differential carrier, and a piston 52 which is movable in the cover and which is supported by a spring 53 on the differential carrier 11. Furthermore, there can be seen a reservoir 55 which is formed by a movable annular piston 54 in the cover 16 and which is resiliently supported in the cover 16 by a spring 56. If there exists a speed differential between the driving rotor 42 and the differential carrier 11, the piston 52, in a way which will not be described in greater detail in this context, moves to the right for the purpose of loading the multi-plate coupling unit 31 in the sense of closing same. For transmitting the piston movement, there is provided a pressure disc 61 at the piston end, a pressure plate 62 at the coupling end, and four sliding members 63–66 which are inserted into and circumferentially distributed in broached grooves 67–70 in the differential carrier. As regards its dimensions for the insertable shaft journals, the differential carrier is symmetric relative to a central plane which contains the axis R and through which the section B—B is taken. In particular, this applies to the length of the housing halves as far as the end faces of the projections 12, 13.

FIGS. 3 and 4, too, will be described jointly. A differential carrier 111 comprises two projections 112, 113 by means of which it can be rotatably supported in a drive housing (not illustrated) around its axis A. Furthermore, it is possible, at the differential carrier 111, to identify a flange 114 to which it is possible to bolt a crown wheel by means of which the differential carrier can be rotatingly driven around its axis A.

The differential carrier 111 consists of a casing 115 provided with the projection 112, and of a cover 116 provided with the projection 113. Two axle shaft bevel gears 119, 120 are arranged co-axially relative to the axis A and engage two differential bevel gears 119, 120 whose axis R extends radially relative to the longitudinal axis A. The differential bevel gears are positioned on a common journal part 121 which is introduced into radially opposed, axially broached grooves 122, 123 in the casing 115 and is secured therein by key faces 124, 125. On their outsides, the differential bevel gears 119, 120 are provided with partially spherical faces by means of which they are supported on supporting dishes 126, 127 inserted into the carrier.

A multi-plate coupling unit 131 is arranged in the casing 115 so as to extend co-axially relative to, and adjoin, the axle shaft bevel gear 117. In this embodiment, the casing 115 forms the outer plate carrier provided with inner teeth 132. An inner plate carrier 133 with outer teeth 134 is arranged so as to adjoin the axle shaft bevel gear 117 and is produced in one piece together with the axle shaft gear 117. The inner plate carrier 113 is supported by a stop disc 136 on the casing 115. The axle shaft bevel gear 117 with the plate carrier 133 is provided with inner teeth 137 which extends over their entire length and into which an axle shaft can be inserted.

A pump unit 141 is arranged so as to adjoin the axle shaft gear 138; again it is provided in the form of a prior art Visco-Lok pump. In this embodiment, the cover 116 constitutes the housing of the pump unit. A driving rotor 142 is arranged so as to extend co-axially relative to, and adjoin, the axle shaft gear 118 and, by means of outer teeth 143, drives an axially movable shear plate 144. The driving rotor is axially supported on the cover 116 by means of a stop disc 146. The axle shaft gear 118 is provided with inner teeth 147. The driving rotor is provided with identically shaped inner teeth 148. Into both sets of inner teeth 147, 148 it is possible to insert, in a rotationally fast way, an axle shaft with a set of correspondingly shaped outer teeth, as a result of which the axle shaft gear 118 and the driving rotor 142 are connected to one another in a rotationally fast way.

As far as further details of the pump unit are concerned, there are shown a grooved and control member 151 which rotates with the differential carrier and a piston 152 which is movable in the cover. The piston 152 is supported on the differential carrier 111 by a spring 153. Furthermore, it is possible to see a reservoir 155 which is formed by a movable annular piston 154 in the cover 116, which annular piston 154 is resiliently supported in the differential carrier by a spring 156. In a way which will not be described here in greater detail, the piston 152 moves to the right if there exists a speed differential between the driving rotor 142 and the differential carrier 111, for the purpose of loading the multi-plate coupling unit 131 in the sense of closing same. For transmitting the piston movement, there are provided a pressure disc 161 at the piston end, a pressure plate 162 at the coupling end, and four sliding members 163–266 which are circumferentially distributed and inserted into broached grooves 167–170 in the differential carrier. As far as its dimensions for inserting the axle journals are concerned, the differential carrier is symmetric relative to a central plane containing the axis R, through which central plane the section B—B is taken. In particular, this applies to the length of the housing halves as far as the end faces of the projections 112, 113.

FIGS. 5 and 6, again, will be described jointly below. The differential carrier 211 is provided with two projections 212, 213 by means of which it can be rotatably supported in a drive housing (not illustrated) around its axis A. Furthermore, the differential carrier 211 is provided with a flange 214 to which it is possible to bolt a crown wheel by means of which the differential carrier can be rotatingly driven around its axis A.

The differential carrier 211 consists of a casing 215 provided with the projection 212, and of a cover 216 provided with the projection 213. Two axle shaft bevel gears 219, 220 are arranged co-axially relative to the axis A and engage two differentials bevel gears 219, 220 whose axis R extend radially relative to the longitudinal axis A. The differential bevel gears are positioned on a common journal part 221 which introduced into radially opposed, axially broached grooves 222, 223 in the casing 215 and is secured therein by key faces 224, 225. On their outsides, the differential bevel gears 219, 220 are provided with partially spherical faces by means of which they are supported on supporting dishes 226, 227 inserted into the carrier. A multi-plate coupling unit 232 is arranged in the casing 215 so as to extend co-axially relative to, and adjoin, the axle shaft bevel gear 217. In this embodiment, the casing 215 forms the outer plate carrier provided with inner teeth 232.

An inner plate carrier 233 with outer teeth 234 is arranged so as to adjoin the axle shaft bevel gear 217 and is produced in one piece together with the axle shaft bevel gear 217. The inner plate carrier 213 is supported by a stop disc 236 on the casing 215. The axle shaft bevel gear 217 with the plate carrier 233 is provided with inner teeth 137 which extends over their entire length and into which an axle shaft can be inserted.

A pump unit 241 is arranged so as to adjoin the axle shaft gear 238, the pump unit again being provided in the form of a so-called Visco-Lok pump. In this embodiment, the cover 216 constitutes the housing of the pump unit. A driving rotor 242 which, by means of outer teeth 243, drives an axially movable shear plate 244, is arranged co-axially relative to, and next to, the axle shaft gear 218. The axle shaft gear 218 and the driving rotor 242 are produced in one piece. The driving rotor is axially supported on the cover 216 by means of a stop disc 246. The axle shaft gear 218 together with the driving rotor 242 is provided with inner teeth 247 into which it is possible to insert an axle shaft with corresponding outer teeth in a rotationally fast way.

FIGS. 5 and 6 show further details of the pump unit, i.e., a grooved and control member 251 which rotates together with the differential carrier, and a piston 252 which is movable in the cover and which is supported by a spring 253 on the differential carrier 211. Furthermore, there can be seen a reservoir 255 which is formed by a movable annular piston 254 in the cover 216 and which is resiliently supported in the cover 216 by a spring 256. If there exists a speed differential between the driving rotor 242 and the differential carrier 211, the piston 252, in a way which will not be described in greater detail in this context, moves to the right for the purpose of loading the multi-plate coupling unit 231 in the sense of closing or engaging same. For transmitting the piston movement, there is provided a pressure disc 261 at the piston end, a pressure plate 262 at the coupling end, and four circumferentially distributed sliding members 263–266 which are inserted into broached grooves 267–270 in the differential carrier. As regards to its dimensions for the insertable shaft journals, the differential carrier is symmetrical relative to a central plane which contains the axis R and through which the section B—B is taken. In particular, this applies to the length of the housing halves as far as the end faces of the projections 212, 213.

FIGS. 7 and 8 will now be described. The differential carrier 311 is provided with two projections 312, 313 by means of which it can be supported in a driving housing (not illustrated) for rotation around its axis A. The differential carrier 311 is provided with a flange 314 to which it is possible to bolt a crown wheel by means of which the differential carrier can be rotatingly driven around its axis A.

The differential carrier 311 has a casing 315 with the formed-on projection 312, and a cover 315 with the formed-on projection 313. Two axle shaft bevel gears 317, 318 are arranged co-axially relative to the axis A and engage three differential bevel gears 319, 320, 328 each of whose axis R extends radially relative to the longitudinal axis A. The differential bevel gears are positioned on a common three-arm journal part 321 which is introduced axially into the casing 315. Key faces 324, 325, 330 at the arms of the journal part 321 are each held in respective recesses 357, 358, 359 of three sliding members 363, 364, 365 which, in turn, are positioned in axially broached grooves 367, 368, 369 in the differential carrier. On their outsides, the differential bevel gears 319, 320, 328 are provided with partially spherical faces by means of which they are supported on supporting dishes 326, 327, 329 inserted into the carrier.

A multi-plate coupling unit 331 is arranged in the casing 315 so as to extend co-axially relative to the axle shaft gear 317. The casing 315 forms the outer plate carrier provided with inner teeth 332. An inner plate carrier 333 with outer teeth 334 is arranged so as to adjoin the axle shaft gear 317 and is produced in one piece with said axle shaft gear 317. The inner plate carrier 333 is supported on the casing 315 by a stop disc 336. The axle shaft bevel gear 317 together with the inner plate carrier 333 is provided with inner teeth 337 into which it is possible to insert an axle shaft.

A pump unit 341 is arranged so as to adjoin the axle shaft gear 338; again, it is provided in the form of a known Visco-Lok pump. The cover 316 constitutes a housing of the pump unit. A driving rotor 342 is arranged so as to extend co-axially relative to, and adjoin, the axle shaft gear 318 and, by means of outer toothing 343, drives an axially movable shear plate 344. The driving rotor is axially supported on the cover 316 by means of a stop disc 346. The axle shaft gear 318 is provided with inner teeth 348. Into the two sets of inner teeth 347, 348 it is possible to insert in a rotationally fast way an axle shaft with corresponding outer teeth, as a result of which the axle shaft gear 318 and the driving rotor 342 are connected to one another in a rotationally fast way.

As far as further details of the pump unit are concerned, there are a grooved and control member 351 which rotates with the differential carrier and a piston 352 which is movable in the cover. The piston 352 is supported on the differential carrier 311 by a spring 353. Further, there is a reservoir 355 which is formed by a movable annular piston 354 in the cover 316, which annular piston is resiliently supported in the differential carrier by a spring 356. In a way which will not be described here in greater detail, the piston 352 moves to the right if there exists a speed differential between the driving rotor 342 and the differential carrier 311, for the purpose of loading the multi-plate coupling unit 331 in the sense of closing or engaging same. For transmitting the piston movement, there are provided a pressure disc 362 at the coupling end and three sliding members 363—365 which are circumferentially distributed and inserted into the broached grooves 367–369 in the differential carrier. As far as its dimensions for inserting the axle journals are concerned, the differential carrier is symmetrical relative to a central plane containing the axis R, through which central plane the section B—B is taken. In particular, this applies to the housing halves as far as the end faces of the projections 312, 313.

Several embodiments have been disclosed. There are modifications of these embodiments which come within the scope of this invention. Thus, the following claims should be studied to determine the true scope of the invention.

DIFFERENTIAL DRIVE

What is claimed is:

1. A differential drive having a controllable braking device controlled by a differential-speed dependent actuating device, comprising:
   a rotatingly drivable differential carrier supported in a drive housing and provided with axle shaft bevel gears co-axially arranged therein and which are connectable to insertable axle shaft journals; and
   a plurality of differential bevel gears rotatably arranged on radial journals in said housing and which each engage both of said axle shaft gears, with axes R of said journals of said differential bevel gears being positioned in a central plane of the differential carrier, and with a multi-plate coupling unit for braking purposes being arranged co-axially in said differential carrier relative to a central plane on a first side of said plane and with a pump unit for actuating purposes being arranged co-axially in said differential carrier relative to said central plane on a second side of said plane.

2. A drive according to claim 1, wherein said pump unit provided with a housing which is connected to said differential carrier, and with a driving rotor arranged co-axially relative to one of said axle shaft gears, which adjoins and is connected to same gear.

3. A drive according to claim 1 wherein said driving rotor and said adjoining axle shaft drive are produced in one piece.

4. A drive according to claim 1, wherein said driving rotor and said adjoining axle shaft gear are produced separately from one another and are provided with identical sets of inner teeth for the purpose of being coupled by an axle shaft journal insertable into both sets of inner teeth.

5. A drive according to claim 1, wherein said driving rotor and said adjoining axle shaft gear are provided with teeth engaging one another at their facing ends and that said driving rotor is provided with a through-bore for passing through an axle shaft journal which is insertable into an adjoining axle shaft gear, said gear being provided with inner teeth (47).

6. A drive according to claim 1, wherein said multi-plate coupling unit is provided with an outer plate carrier connected to said differential carrier, and with an inner plate carrier arranged co-axially relative to the other one of said axle shaft gears, which adjoins and is connected to said other gear.

7. A drive according to claim 1, wherein said inner plate carrier and said adjoining axle shaft gear are produced in one piece.

8. A drive according to claim 1, wherein said inner plate carrier and said adjoining axle shaft gear are produced separately from one another and are provided with identical sets of inner teeth for the purpose of being coupled by an axle shaft journal insertable into both sets of inner teeth.

9. A drive according to claim 1, wherein said inner plate carrier and said adjoining axle shaft gear are provided with teeth engaging one another at their facing ends and that said inner plate carrier is provided with a through-bore for passing through an axle shaft journal insertable into an adjoining axle shaft gear, said gear being provided with inner teeth.

10. A drive according to claim 1, wherein a cover element of said differential carrier forms a housing of said pump unit into said housing there is movably inserted a piston loaded by the pressure generated in said pump unit.

11. A drive according to claim 1, wherein a cup element of said differential carrier directly forms said outer plate carrier of said multi-plate coupling unit.

12. A drive according to claim 1, wherein sliding members are movably inserted into inwardly opening axial grooves in said differential carrier to effect a transmission of force from said piston of said pump unit to a pressure plate of said multi-plate coupling unit.

13. A drive according to claim 12, wherein said axial grooves are outwardly undercut and hold said sliding members so that the latter cannot be lost.

14. A drive according to claim 1, wherein said journal part for said differential bevel gears is inserted into inwardly opening axial grooves in said differential carrier.

15. A drive according to claim 1, wherein said journal part is inserted into radial bores in said differential carrier.

16. A drive according to claim 15, wherein said differential carrier, in the region of a central plane, comprises openings for inserting securing elements for said axle shaft journals.

17. A drive according to claim 1, wherein said pump unit is provided with a circumferential groove which rotates with said differential carrier and whose length is limited, and with a shear plate which rotates with said driving rotor and covers said groove, wherein in any case one end of said groove is connected to a reservoir for the shear fluid and the other end of said groove is connected to a pressure chamber delimited by said piston.

18. An axle assembly with a differential drive according to claim 1, having axle shaft journals inserted into said axle shaft gears, said axle shaft journals of both sides are of identical shape and length.

19. An assembly according to claim 18, wherein said axle shaft journals at their inner ends positioned in the differential carrier, are provided with securing rings which engage annular grooves and which are supported axially outwardly on the axle shaft gears.

20. An assembly according to claim 18, wherein said axle shaft journals at their ends positioned in said differential carrier, are axially inwardly supported on a locking member which is radially insertable into said differential carrier.

* * * * *